United States Patent [19]

Marion et al.

[11] 4,205,963
[45] *Jun. 3, 1980

[54] PROCESS FOR GAS CLEANING WITH RECLAIMED WATER AND APPARATUS FOR WATER RECLAMATION

[75] Inventors: Charles P. Marion, Mamaroneck, N.Y.; Lawrence E. Estabrook, Long Beach; George N. Richter, San Marino, both of Calif.

[73] Assignee: Texaco Inc., White Plains, N.Y.

[*] Notice: The portion of the term of this patent subsequent to Feb. 27, 1996, has been disclaimed.

[21] Appl. No.: 955,545

[22] Filed: Oct. 27, 1978

Related U.S. Application Data

[63] Continuation-in-part of Ser. No. 900,951, Apr. 28, 1978, Pat. No. 4,141,696.

[51] Int. Cl.² .................. C10J 3/00; C01B 2/14
[52] U.S. Cl. ...................... 48/197 R; 48/201; 48/212; 210/39; 252/373
[58] Field of Search ............ 48/197 R, 200, 201, 48/212, 215, DIG. 7; 252/373; 202/158; 203/88, 10, 11; 261/114 R, 118, 18 R, 8; 210/39, 40, 33

[56] References Cited

U.S. PATENT DOCUMENTS

| | | | |
|---|---|---|---|
| 3,434,701 | 3/1969 | Bauer | 202/158 |
| 3,980,590 | 9/1976 | Marion | 48/212 |
| 4,141,696 | 2/1979 | Marion et al. | 48/197 R |

*Primary Examiner*—S. Leon Bashore
*Assistant Examiner*—George C. Yeung
*Attorney, Agent, or Firm*—Carl G. Ries; Robert A. Kulason; Albert Brent

[57] ABSTRACT

Dispersions comprising water and particulate solids i.e. carbon and ash are produced in at least one gas cooling or scrubbing zone by quench cooling or scrubbing the raw gas stream from a partial oxidation gas generator with water. The dispersions are resolved by liquid extraction in a decanting zone to produce a water layer containing carbon, dissolved gas, and ash, and also a separate dispersion comprising carbon, extractant, and water. Solids-free water, liquid extractant and uncondensed gases are then separated from each other in a distillation and separation operation. Water is removed from a separation vessel in said operation and introduced on to a stripping plate of a flash column containing at least one stripping plate. The solids-containing water from the decanting zone is flashed below said stripping plate and a portion is converted into steam. The steam passes up through holes or bubble caps in the stripping plate and is dispersed through the water contained on said plate. If desired, a portion of the water obtained from blowing-down a gas cooler may be flashed to steam below the stripping plate. Unvaporized water falls to the bottom of the column where a vertical weir separates the flash column into two chambers. Solids settle out of the water in the first chamber and clarified water flows over the weir into the second chamber. Overflow water from the bottom stripping plate is discharged below the water-level in the second chamber by way of a downcomer. Reclaimed water is pumped to said gas cooling and scrubbing zones from the second chamber, and waste water containing solids in the first chamber is discharged from the system. The overhead from the flash column is cooled below the dew point and introduced into said separation vessel.

25 Claims, 2 Drawing Figures

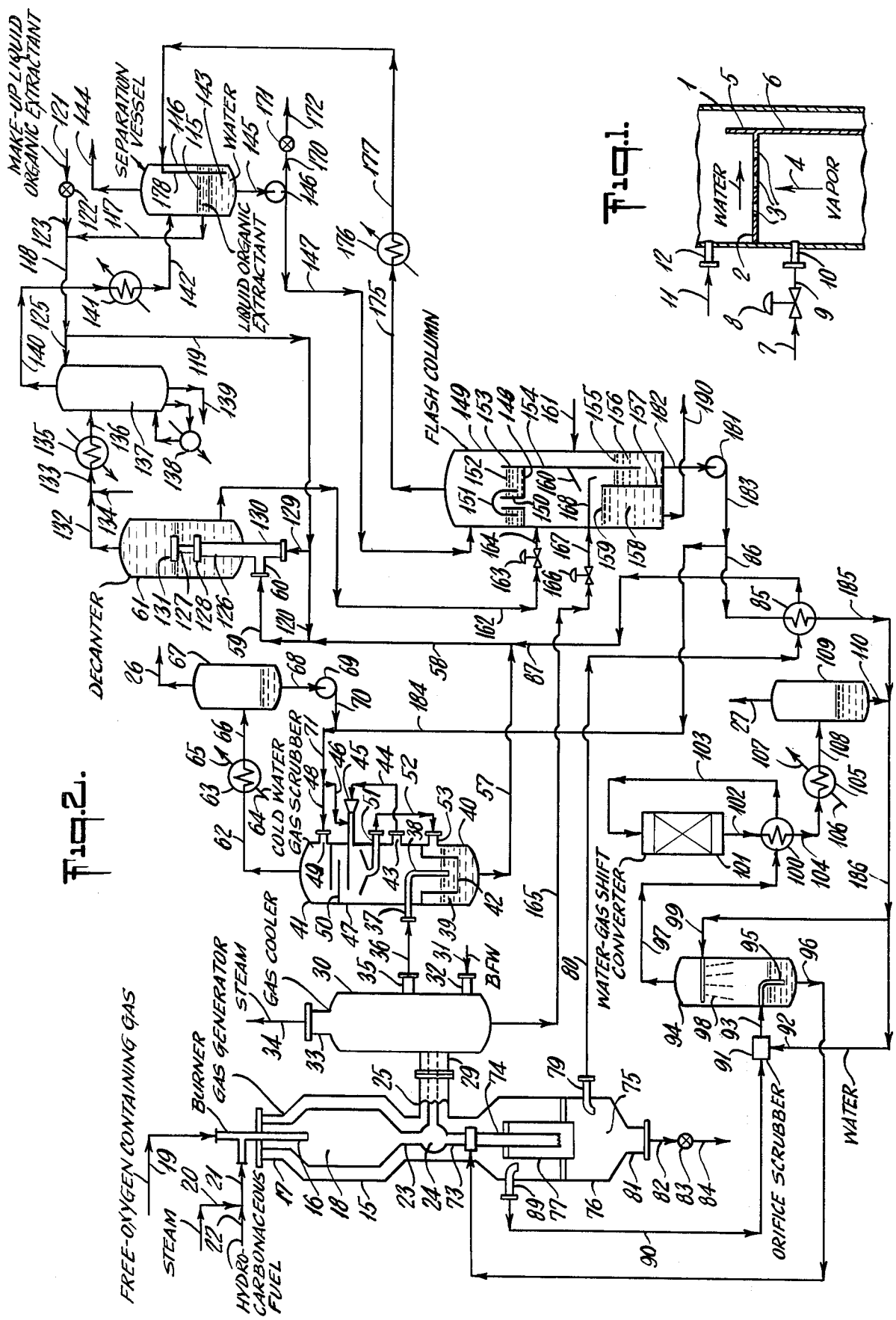

PROCESS FOR GAS CLEANING WITH RECLAIMED WATER AND APPARATUS FOR WATER RECLAMATION

This application is a continuation-in-part of our application Ser. No. 900,951 filed Apr. 28, 1978, now U.S. Pat. No. 4,141,696.

BACKGROUND OF THE INVENTION

1. Field of the Invention

This is a gas cleaning process and includes a flash column apparatus for water reclamation. More specifically, this process pertains to cooling and scrubbing the raw gas stream from a partial oxidation gas generator with reclaimed water and recovering, purifying, and recycling the water.

2. Description of the Prior Art

Synthesis gas mixtures comprising hydrogen and carbon monoxide, and containing entrained particulate carbon may be prepared by the partial oxidation of a fossil fuel with a free-oxygen containing gas, optionally in the presence of a temperature moderator. The hot effluent gas stream from the gas generator may be cooled by direct immersion in water in a quench drum such as described in coassigned U.S. Pat. Nos. 2,896,927 and 3,929,429. A portion of the entrained solids are removed by the quench water. Following the direct quench cooling, the gas is scrubbed with water to further remove particulates. Alternatively, the hot effluent gas stream may be cooled in a gas cooler such as shown in coassigned U.S. Pat. No. 3,920,717 and then scrubbed with water. The quench-water or the scrubbing water may be then processed in the manner described in coassigned U.S. Pat. Nos. 2,992,906, 3,097,081, and 4,014,786.

SUMMARY

Particulate solids i.e. carbon soot and ash entrained in the hot raw gas stream from a partial oxidation gas generator are removed by quench cooling the hot gas stream directly in reclaimed water in a quench drum, or by scrubbing with reclaimed water in a gas scrubbing zone after indirect heat exchange in a gas cooler or both. By this means, a clean gas stream and a dispersion of particulate solids i.e. carbon and ash are produced. Depending on composition, the clean gas stream is intended for use as synthesis gas, reducing gas, or fuel gas.

It is economic to reclaim the water in the aforesaid dispersion by removing particulate solids and gaseous impurities. The reclaimed water may be then recycled to the gas quench cooling and scrubbing zones. This is done in the subject process by mixing said dispersion of solids and water together with a liquid extractant. A dispersion comprising particulate carbon, extractant, and a small amount of water is formed and in a decanter separates from a dilute water layer which settles to the bottom of the decanter comprising water, dissolved gases, waste hydrocarbons, ash, and a very small amount of carbon. In a preferred embodiment, heavy liquid hydrocarbon is mixed with the dispersion of carbon, extractant, and water from the decanter. In a distillation and separation operation, the extractant and water are vaporized, condensed and separated by gravity in a separation vessel. At least a portion of the solids-free condensed water is withdrawn from the separation vessel and is introduced on to a stripping plate of a flash column containing one or more plates. At least a portion of the extractant from the separation vessel is recycled to said decanter. Any uncondensed gases i.e. $H_2S$, $NH_3$, $CO_2$; and waste hydrocarbons may be removed from the top of said separation vessel. Overhead vapors from the flash column are cooled to condense out water and introduced into said separation vessel.

The stream of dilute water is removed from the bottom of the decanter and is introduced into the flash column below a stripping plate. A portion of this water is flashed into steam which passes up through the column. The remainder passes down through the column and drops into the receiving side chamber at the bottom. If desired, a small stream of blowdown water from a gas cooler in the system, such as after the gas generator, may be similarly introduced into the flash column. A portion of this water is flashed into steam and the remainder drops either into the return water side or into the receiving side chamber at the bottom of the flash column. The flashing steam passes up through gas dispersers i.e. holes or bubble-caps in the stripping plate or plates and strips the vaporizable impurities from the water contained on the stripping plate.

The bottom of the flash column is partitioned by means of a vertical weir into said two chambers, i.e. a receiving side and a return water side. Solids in the water in the receiving side chamber settle to the bottom. The water in the receiving side chamber overflows the weir and falls into the chamber on the return-water side. Steam stripped over-flow water from the stripping plate or plates flows through a downcomer system that discharges stripped water from plate to plate and finally exits below the water level in said return water side chamber. A small amount of waste water containing solid sediment is removed at the bottom of the receiving side chamber and is discharged from the system. If desired, the waste water may be sent to a water treating plant. Substantially solids-free reclaimed water is pumped out of the return water side chamber and recycled to the gas quench cooling tank, or to the scrubbing zones, or to both places. Optionally, a portion of this water may be recycled to the gas generator as a portion of the moderator.

BRIEF DESCRIPTION OF THE DRAWING

The invention will be further understood by reference to the accompanying drawing.

FIG. 1 of the drawing is a schematic representation of a crossflow sieve type stripping plate showing the direction of flow for liquid and vapor streams.

FIG. 2 of the drawing is a schematic representation of a preferred embodiment of the process.

DESCRIPTION OF THE INVENTION

In the subject process, a raw gas stream, substantially comprising $H_2$, $CO$, and at least one gas from the group $H_2O$, $CO_2$, $H_2S$, $COS$, $CH_4$, $NH_3$, $N_2$, $Ar$ and containing entrained solids i.e. particulate carbon, ash is produced by partial oxidation of a hydrocarbonaceous fuel with a free-oxygen containing gas, optionally in the presence of a temperature moderator, in the reaction zone of an unpacked free-flow noncatalytic partial-oxidation gas generator. The atomic ratio of free oxygen to carbon in the fuel (O/C ratio), is in the range of about 0.6 to 1.6, and preferably about 0.8 to 1.4. The reaction time is in the range of about 1 to 10 seconds, and preferably about 2 to 6 seconds. When steam is used as the temperature moderator the steam-to-fuel weight ratio in the reaction zone is in the range of about 0.1 to 5, and preferably about 0.2 to 0.7.

The raw gas stream exits from the reaction zone at a temperature in the range of about 1300° to 3000° F., and preferably 2000° to 2800° F., and at a pressure in the range of about 1 to 250 atmospheres, and preferably 15 to 150 atmospheres.

The composition of the raw gas stream leaving the gas generator is about as follows, in mole percent on a dry basis: $H_2$ 60 to 29, CO 20 to 57, $CO_2$ 2 to 30, $CH_4$ nil to 25, $H_2S$ nil to 2, COS nil to 0.1, $NH_3$ nil to 0.1, $N_2$ nil to 60, and Ar nil to 0.5. Water is present in the gas in the range of about 1 to 75 mole percent. Particulate carbon is present in the range of about 0.1 to 20 weight % (basis carbon content in the original feed). Ash may be present. Depending on the composition, the gas stream may be employed as synthesis gas, reducing gas, or fuel gas.

The gas generator comprises a vertical cylindrically shaped steel pressure vessel lined with refractory, such as shown in coassigned U.S. Pat. No. 2,809,104. A typical quench drum for cooling the hot effluent stream of gas from the reaction zone to a temperature in the range of about 300° F. to 600° F. by direct contact with water is also shown in said patent. At least a portion of the entrained solids i.e. particulate carbon, ash, are removed from the process gas stream by the turbulent quench water and a pumpable dispersion of particulate carbon and water containing about 0.1 to 4.0 wt. % particulate solids is produced in the quench tank. Any remaining entrained solids may be removed from the process gas stream by additional scrubbing with water. A burner, such as shown in coassigned U.S. Pat. No. 2,928,460, may be used to introduce the feed streams into the reaction zone.

Alternatively, the hot effluent gas stream leaving the gas generator may be cooled to a temperature in the range of about 350° to 750° F. but above the dew point of water by indirect heat exchange with boiler feed water in a gas cooler, such as shown and described in coassigned U.S. Pat. No. 3,920,717. The cooled process gas stream is then cleaned by scrubbing with water in a conventional gas scrubbing zone. For example, the gas scrubber as shown in the drawing, or the venturi or jet scrubber as shown in Perry's Chemical Engineer's Handbook, Fifth Edition, McGraw-Hill Book Company 1973, Fig. 20-120 and Fig. 20-121.

In the embodiment shown in the drawing, both methods of cooling the effluent gas stream from the gas generator are employed. The effluent gas stream is split into two separate gas streams which are processed in two separate trains. A portion of the hot effluent gas stream is cooled by indirect heat exchange in a gas cooler in the first train; and, the remainder of the gas stream is cooled by direct contact with water in a quench tank in the second train.

A wide range of combustible carbon-containing organic materials may be reacted in the gas generator with a free-oxygen containing gas, optionally in the presence of a temperature-moderating gas, to produce the raw gas stream.

The term hydrocarbonaceous as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". For example, there are (1) pumpable slurries of solid carbonaceous fuels, such as particulate carbon dispersed in a vaporizable liquid carrier, such as water, liquid hydrocarbon fuel, and mixtures thereof; and (2) gas-liquid-solid dispersions, such as atmoized liquid hydrocarbon fuel and particulate carbon dispersed in a temperature moderating gas.

The term liquid hydrocarbon, as used herein to describe suitable liquid feedstocks, is intended to include various materials, such as liquefied petroleum gas, petroleum distillates and residua, gasoline, naphtha, kerosine crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

Gaseous hydrocarbon fuels, as used herein to describe suitable gaseous feedstocks, include methane, ethane, propane, butane, pentane, natural gas, coke-oven gas, refinery gas, acetylene tail gas, ethylene off-gas, and mixtures thereof. Solid, gaseous, and liquid feeds may be mixed and used simultaneously; and these may include paraffinic, olefinic, acetylenic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The hydrocarbonaceous feed may be at room temperature, or it may be preheated to a temperature up to as high as about 600° to 1200° F. but preferably below its cracking temperature. The hydrocarbonaceous feed may be introduced into the gas-generator burner in liquid phase or in a vaporized mixture with the temperature moderator.

The need for a temperature moderator to control the temperature in the reaction zone depends in general on the carbon-to-hydrogen ratios of the feedstock and the oxygen content of the oxidant stream. A temperature moderator may not be required with some gaseous hydrocarbon fuels, however, generally one is used with liquid hydrocarbon fuels and with substantially pure oxygen. Steam may be introduced as a temperature moderator in admixture with either or both reactant streams. Alternatively, the temperature moderator may be introduced into the reaction zone of the gas generator by way of a separate conduit in the burner. Other temperature moderators include: $CO_2$, $N_2$, a cooled portion of the effluent gas stream from the gas generator, and mixtures thereof.

The term free-oxygen containing gas as used herein means air, oxygen-enriched-air i.e. greater than 21 mole % $O_2$, and substantially pure oxygen, i.e. greater than about 95 mole % oxygen (the remainder usually comprising $N_2$ and rare gases). Free-oxygen containing gas may be introduced by way of the partial-oxidation burner at a temperature in the range of about ambient to 1800° F.

The raw synthesis gas exiting from the reaction zone of the gas generator is preferably split into two streams which are then simultaneously processed in two separate trains. In the first train no water-gas shifting takes place, whereas in the second train water-gas shifting of the crude gas stream does take place. By this means, the product gas from the second train has a greater mole ratio of $H_2$/CO than that produced in the first train.

The split of the raw synthesis gas between the two trains may be calculated by material and heat balances. The calculated split may be then adjusted, if necessary, during actual operation. Accordingly, said calculations take into consideration the compositions of the hydrocarbonaceous fuel and the raw synthesis gas, the amount and desired composition of the clean purified synthesis gas product stream, the desired amount of hydrogen rich product gas, the desired amount and efficiency of the catalytic water-gas shift conversion, and the desired amount of by-product steam. For example, from about 0 to 100 volume %, such as about 5 to 95 volume % of the raw gas stream leaving the reaction zone of the gas generator may be directly introduced into a quench drum containng water in the second train. When the feed to the gas generator includes a high ash fuel i.e. coal about 5–10 volume % of the raw gas stream may be introduced into the quench drum to carry the slag. The remainder of the synthesis gas from the gas generator may be passed through an insulated transfer line, and directly into a gas cooler in the first train. There the hot gases are passed in indirect heat exchange with boiling water, thereby cooling the gas stream to a temperature in the range of about 350° to 750° F. while simultaneously producing by-product steam.

The by-product steam may be used elsewhere in the process where required. Further, it may be produced at a pressure which is greater than that in the gas generator. Portions of the by-product steam may be used—for example, as the temperature moderator in the gas generator, as a carrier for the hydrocarbonaceous fuel, or as the working fluid in an expansion turbine; i.e. turbocompressor or turboelectric generator. The steam may also be used to power an air-separation unit that produces the substantially pure oxygen used in the gas generator.

The amount of solid particles, i.e. selected from the group: particulate carbon, ash, and mixtures thereof, entrained in the raw gas stream leaving the reaction zone is dependent on the type of hydrocarbonaceous fuel and the atomic ratio (O/C) in the reaction zone. A minimum amount of entrained particulate carbon i.e., about 1–2 wt. % (basis weight of C in the hydrocarbonaceous feed), is recommended to increase the life of the refractory lining the gas generator when the feed contains Ni and V impurities.

The quench drum in the second train, also known as the quench tank, is located below the reaction zone of the gas generator. The split stream of raw gas which it receives for cooling and cleaning carries with it substantially all of the ash and a substantial part of the particulate-carbon soot leaving the reaction zone of the gas generator. A dispersion is produced in the quench tank comprising quench water, about 0.1 to 4.0 wt. % of particulate solids i.e. carbon and ash, and a minor amount of water soluble impurities. Any unburned inorganic solids such as coarse ash from solid fuels and refractory may accumulate at the bottom of the quench tank. Periodically, this material may be removed as a water slurry through a conventional lock-hopper system. Optionally, water may be separated from this slurry by conventional means i.e. gravity settling, flotation, centrifuge, or filtration. The water may be recycled in the process for further purification along with the quench water.

To prevent plugging any downstream catalyst beds, a secondary gas cleaning zone preferably follows the quench tank in the second train. The secondary gas cleaning zone may include conventional orifice and venturi scrubbers and sprays by which the process gas stream is scrubbed with reclaimed water. The scrub water containing less than about 0.1 wt. % solids is preferably recycled to the quench tank. By this means the amount of solid particles in the process gas stream may be reduced to less than about 3 parts per million (PPM), and preferably less than about 1 ppm. The mole ratio of $H_2O/CO$ in the process gas stream in the second train may be increased to a value in the range of about 2 to 5, and preferably 2.5 to 3.5 by vaporizing water during the quenching and scrubbing steps that may follow. This ratio is suitable for the next step in the second train, in which the water-gas shift reaction takes place.

Thus, after leaving the secondary gas scrubbing zone, the soot-free gas stream in the second train is preferably introduced into a conventional catalytic water-gas shift reaction zone at an inlet temperature in the range of about 350° to 775° F. CO and $H_2O$ are reacted over a conventional water-gas-shift catalyst which may comprise iron oxide mixed with Cr oxide and promoted by 1 to 15 wt. % of an oxide of another metal, such as K, Th, U, Be or Sb. Reaction occurs at about 500° to 1050° F. Alternatively, cobalt molybdate on alumina may be used as the water-gas shift catalyst at a reaction temperature in the range of about 500° to 900° F. Co-Mo catalysts comprise, in weight percent: CoO 2–5, $MoO_3$ 8–16, MgO nil–20, and $Al_2O_3$ 59–85. A low-temperature shift catalyst for use with sulfur-free gas streams comprises a mixture of copper and zinc salts or oxides in a weight ratio of about $\frac{1}{2}$ to 3 parts by weight zinc to 1 part copper.

Next, substantially all of the $H_2O$ is removed from the gas stream in the second train. For example, the clean gas stream may be cooled to a temperature below the dew point of water by conventional means to condense out and to separate $H_2O$. If desired, the gas stream may be substantially dehydrated by contact with a desiccant, such as alumina. With oxygen gasification, a clean shifted product gas stream is thereby produced having the following composition in mole %: $H_2$ 98 to 60, CO nil to 5, $CO_2$ 15 to 40, $CH_4$ nil to 5, $H_2O$ nil to 5, Ar nil to 0.5, $N_2$ nil to 1, $H_2S$ nil to 2, and $NH_3$ nil to trace.

The cooled process gas stream leaving the gas cooler in the first train is scrubbed with water in a conventional gas scrubbing zone to remove particulate solids i.e. carbon and ash. A dispersion of scrubbing water containing about 0.1 to 4.0 wt. % of particulate solids, and a minor amount i.e. in PPM (parts per million) of water soluble impurities is produced. The gas stream leaving the cleaning zone in the first train is optionally cooled below the dew point and is then introduced into a knockout or separation vessel. With oxygen gasification, a clean unshifted product gas stream is thereby produced having the following composition in mole %: $H_2$ 60 to 29, CO 20 to 57, $CO_2$ 2 to 30, $CH_4$ nil to 25, $H_2O$ nil to 20, $H_2S$ nil to 2, COS nil to 0.1, $NH_3$ nil to trace, $N_2$ nil to 1 and Ar nil to 0.5.

As previously described, the gas cooler cools the hot raw synthesis gas by indirect heat exchange with boiler feed water. A small blowdown stream may be periodically taken from the water being vaporized to control the buildup of dissolved solids in the water. The blowdown water leaving the gas cooler may contain a minor amount (in PPM) of metal salts i.e. chlorides, sulfates, and phosphates. The blow-down water stream leaves the gas cooler i.e. waste-heat boiler at a temperature in the range of about 300° to 600° F., say about 550° F. The pressure corresponds to that of the steam produced in the boiler.

The dispersions of water-particulate solids from the quench tank in the second train, or from the scrubbing zone in the first train, or from both are introduced in admixture with a suitable liquid organic extractant such as light liquid hydrocarbons i.e. naphtha into a carbon separation zone. Conventional horizontal and vertical decanters may be employed. The liquid organic extractant may be added in one or two stages. A description of suitable vertical decanters, liquid organic extractants, and methods of operation are described in coassigned U.S. Pat. No. 4,014,786, which is incorporated by reference.

In one embodiment of the subject process, a two-stage decanting operation is used. A first portion of the liquid organic extractant separated downstream in the process is mixed with all of the carbon-water dispersion. The amount of liquid organic extractant is sufficient to resolve the carbon-water dispersion. This amount may be in the range of about 1.5 to 15 lbs. of extractant per lb. of carbon. The mixture is then introduced into the first stage of a two-stage decanting operation. Simultaneously, a second portion of the liquid organic extractant in an amount sufficient to produce a pumpable liquid organic extractant-carbon-water dispersion having a solids content in the range of about 0.5 to 9 wt. % is introduced into the second stage.

Suitable liquid organic extractants that form dispersions with particulate carbon which are lighter than water include: (1) light liquid hydrocarbon fuels having an atmospheric boiling point in the range of about 100° to 750° F., density in degrees API in the range of over 20 to about 100, and a carbon number in the range of about 5 to 16; (2) a mixture of substantially water insoluble liquid organic by-products from an oxo or oxyl process; and (3) mixtures of types (1) and (2). Examples of type (1) liquid extractants include butanes, pentanes, hexanes, toluol, natural gasoline, gasoline, naphtha, gas oil, their mixtures and the like. Ingredients in the mixture comprising type (2) extractants include at least one alcohol, at least one ester and at least one constituent from the group consisting of aldehydes, ketones, ethers, acids, olefins, and saturated hydrocarbons.

The particulate solids in the water dispersions introduced into the decanter comprises carbon and ash. The particulate carbon is in the form of free-carbon black or soot. The Oil Absorption No. of the carbon soot, as determined by ASTM Method D-281, is greater than 1 and usually varies from 2 to 4 cc of oil per gram of C. The inorganic ash from the oil in these dispersions comprises metals and the sulfides. For example, for petroleum derived fuels these components may be selected from the group Ni, V, and Fe, and mixtures thereof. Further, for such fuels the amount of soluble impurities in the dispersions of water-particulate solids comprise in parts per million (PPM): ammonia 0 to 10,000; formate 0 to 10,000; sodium chloride 0 to 5000; nickel 0 to 25; iron 0 to 150; sulfide 0 to 500; and cyanide 0 to 100.

One or two-stage decanters may be employed. The decanter is operated at a temperature in the range of about 180° to 500° F. and preferably above 250° F. The pressure in the decanter is basically set by the temperature. The pressure must be high enough to keep the liquid organic extractant in a liquid phase. Thus, when the decanter bottoms outlet temperature is 300° F., and the liquid organic extractant is naphtha, the pressure in the decanter may be at least 300 psia. The total amount of liquid organic extractant that may be introduced into a one or two-stage decanting operation is in the range of about 10 to 200 times, such as 30 to 70 times, the weight of the particulate carbon in the carbon-water dispersion. The dispersion of water and particulate solids is resolved in the decanter. A stream of water containing about 100 to 500 parts per million by weight of particulate carbon and about 20 to 60 wt. % of the ash separates out by gravity and leaves at the bottom of the decanter. Most of the other impurities in the dispersions of water-particulate solids that enter the decanter in the feed, as mentioned previously, are also included in this water stream that leaves from the bottom of the decanter. This dilute water dispersion leaves the decanter at a temperature in the range of about 180° to 500° F., say 250° to 350° F. and a pressure of about 150 to 1000 psig, say about 250 to 500 psig. The water may contain gaseous impurities selected from $H_2S$, $CO_2$ and $NH_3$. The residence time in the decanter may be in the range of about 2 to 20 minutes, say 6 to 15 minutes.

A dispersion of carbon-liquid extractant containing about 0.5 to 9 wt. % of particulate carbon and about 0.5 to 10 wt. % of carry-over water is removed from the top of the decanter. In a preferred embodiment, this stream is mixed with a heavy liquid hydrocarbon fuel i.e. fuel oil, crude oil having a gravity in degrees API in the range of about $-20$ to 20. The mixture is then introduced into a distillation column. The amount of heavy liquid hydrocarbon fuel, as previously described, is kept to a minimum. This amount should be sufficient only to form a pumpable bottoms slurry with the particulate carbon separated from said carbon-extractant dispersion. The aforesaid pumpable bottoms slurry may have a carbon content of about 0.5 to 25 wt. percent and preferably 4 to 8 wt. percent. The slurry of carbon and heavy liquid hydrocarbon is removed from the bottom of the distillation column and sent to the gas generator as a portion of the feed. The overhead vapors from the distillation column are cooled to a temperature below the dew points of the liquid organic extractant and water. The liquid organic extractant and water containing any dissolved acid-gases and a minor amount of hydrocarbons extracted by the water from the liquid organic extractant and the heavy hydrocarbonaceous liquid settle out and are separated in a separation vessel. When emulsion forming impurities are present in the heavy liquid hydrocarbon fuel or in the liquid organic extractant, by cooling the overhead from the distillation column to a temperature above which the aqueous emulsion does not form, say at a temperature greater than 140° F., the formation of troublesome emulsions in the separating tank may be avoided. At least a portion, and preferably all, of the liquid organic extractant is removed from the separation vessel and is recycled to the inlet of the decanter where it is introduced with the incoming dispersion of water and particulate carbon. Optionally, a portion of the liquid organic extractant may be recycled back to the distillation column as reflux. At least a portion of the water layer is removed from the bottom of the separating tank following the distillation column at a temperature in the range of about 80° to 150° F. and a pressure in the range of about 0 to 50 psig. Optionally, a portion of the water from the separation vessel may be introduced, in liquid or vapor phase, into the gas generator as a portion of the temperature moderator. At least one uncondensed acid-gas from the group $H_2S$, COS, and $CO_2$ if present may be removed from the top of the separation vessel.

In one embodiment the hydrocarbonaceous feed to the gas generator comprises liquid hydrocarbon distillate substantially comprising about $C_3$ to about $C_{10}$ hydrocarbons and a dispersion of particulate carbon and said liquid hydrocarbon distillate. In this case the liquid hydrocarbon distillate is also employed as the liquid organic extractant in the decanter. The distillation column may be thereby eliminated, and the overhead stream of carbon-extractant dispersion from the decanter may be then introduced, with or without heat exchange, into the gas generator as a portion of the feedstock.

Advantageously, water employed in the subject process for quench cooling and scrubbing the process gas stream is reclaimed by removing particulate solids and gaseous impurities in a flash column. The reclaimed water is then recycled to the gas quenching and scrubbing zones. The water flash column comprises: an upright column; at least one, such as 1-5 and preferably one horizontal stripping plate spaced within said column for holding water to be stripped, each plate containing dispersive means for dispersing steam through the water on said stripping plate, and over-flow and down-flow means for continuously discharging the steam stripped water from plate to plate and finally into a return water-side chamber below; a vertical weir separating the column at the bottom into a first or receiving-side chamber filled with water, and said second or return water-side chamber for holding the water that overflows said vertical weir from said first chamber and the steam stripped water that overflows the stripping plate in a single plate column or the bottom stripping plate in a multiplate column whereby the water is discharged below the level of the liquid in said second chamber; inlet means for flashing at least one stream of water containing particulate solids into the space below the bottom stripping plate and above said first or second chambers, and inlet means for introducing at least one stream of water containing substantially no solids on to at least one stripping plate, and preferably the top stripping plate; outlet means for removing from the column an overhead stream of vapors comprising at least one member of the group $H_2O$, $CO_2$, $H_2S$, $NH_3$, and hydrocarbons; outlet means at the bottom of said tower for removing from said second chamber a stream of reclaimed water of substantially reduced solids content; and outlet means for removing from said first chamber a stream of waste water containing particulate solids.

The top horizontal stripping plate in the flash-tower is preferably spaced from about $\frac{1}{3}$ to $\frac{3}{4}$ of the height of the column. Conventional crossflow plates, including bubble-cap, sieve, or valve equipped with at least one downcomer may be employed. Gas dispersers include perforations in the plates or bubble caps. Perforated plates include sieve plates or valve plates. For example, sieve-plate dispersers contain drilled or punched holes $\frac{1}{8}$ to $\frac{1}{2}$ inch diameter. Liquid is prevented from flowing down through the perforation by the upward flowing action of the vapor. Thus, the pressure in the tower below a stripping plate is about 1 to 3 psig greater than the pressure in the tower above the stripping plate. With bell caps and tunnel caps, the vapor flows up through a center riser in the plate, reverses flow under the cap, passes downward through the annulus between the riser and cap, and finally passes through the liquid on the plate through a series of peripheral openings or slots in the lower side of the cap.

The downcomer zones generally occupy about 5 to 30 percent of the total cross section, such as 5 to 15% for segmental downcomers, as shown in the drawing. Included is a vertical weir which extends upwards from the stripping plate. Steam stripped water continuously builds-up on the plate and overflows said weir. Additional information on stripping plate design may be obtained from Chemical Engineers Handbook, Robert H. Perry and Cecil H. Chilton, Fifth Edition 1973 McGraw-Hill Book Co. Page 18-3 to 18-19.

The overhead stream of vapors leaves the water-flash column at a temperature in the range of about 212° to 275° F. This stream is cooled below the dew point and water and liquid hydrocarbons are condensed out and are separated from the uncondensed gases in a separation vessel. Advantageously, in the subject embodiment, the separation vessel is the same vessel that is used to receive the cooled stream of water, liquid organic extractant, and uncondensed gases from the distillation column. Any uncondensed vapors from the group $H_2S$, $CO_2$, $NH_3$, hydrocarbons, and mixtures thereof are removed from the top of the separation vessel. Clear water is drawn off from the bottom of the separation vessel and is recycled to the water flash column where it is introduced on to a stripping plate at a temperature in the range of about 80° to 175° F. In a multiplate flash column, this water stream is preferably introduced on to the top plate.

In the operation of the flash column water streams containing substantially no solids i.e. solids-free are introduced on to a stripping plate, i.e., preferably the top plate. Solids containing water streams and blow-down water streams, if any, are flashed into the column to produce steam in the space below the bottom stripping plate and above the two chambers in the bottom of the column. Thus, the dilute dispersion of water and particulate solids from the bottom of the decanter, and at substantially the same conditions of temperature and pressure less ordinary losses in the line, is passed through a pressure reducing means such as an expansion valve. The pressure is dropped to about 0 to 30 psig, and for example up to 10 wt.%, say about 1-7 wt.%, is flashed into steam. The stream is introduced into the flash column below the stripping plate at the bottom of the column and in the space above the receiving side chamber. The steam passes up through the gas dispersers in the perforated plate, as previously described. The unvaporized portion of said stream and the dispersed solids fall into the receiving side chamber. If desired, a portion of the blow-down water stream from the gas cooler following the gas generator may be similarly passed through a pressure reducing means, such as an expansion valve, and reduced to a pressure in the range of about 0 to 30 psig prior to being introduced into the flash column. A portion of the water in this stream is flashed into steam i.e. up to 25 wt.%, say 5 to 15 wt.%. This stream contains practically no particles and may be introduced into the flash column below the bottom stripping plate and in the space preferably, above the return water side chamber. Optionally, the blow-down water stream may be flashed into the space above the receiving side chamber. The solids-free water from the separator following the distillation column is introduced on to a stripping plate in the flash column. Preferably, this solids-free water stream is introduced in the space at the upper part of the flash column above the top tray. Fresh water make-up may be introduced into the return water side chamber of the flash column.

Reclaimed water containing from about 0 to 0.05 wt.% particulate solids may be withdrawn from the return water side chamber at a temperature in the range of about 212° to 275° F. and a pressure in the range of about 0 to 30 psig and recycled to the scrubbing zone in the first train, the scrubbing and quench zones in the second train, or to both trains. Optionally, a portion of this water may be recycled to the gas generator. A stream of waste water at substantially the same temperature and pressure as the reclaimed water may be removed from the receiving chamber and discharged from the system. The waste water stream may contain about 0 to 0.2 wt.% particulate solids, and the following soluble impurities in PPM: ammonia 0 to 10,000; formate 0 to 10,000; sodium chloride 0 to 5,000; sulfide 0 to 500; nickel 0 to 25; iron 0 to 150, and cyanide 0 to 100.

DESCRIPTION OF THE DRAWING

A more complete understanding of the invention may be had by reference to the accompanying drawing. FIG. 1 is a fragmental schematic representation of a vertical cylindrically shaped flash-tower 1 taken around stripping plate 2. Small diameter holes 3 are drilled in plate 2 and the rate of flow of vapors 4 up through the holes in plate 2 prevents the water on plate 2 from passing down through the holes. By this means the vaporizable impurities may be stripped from the water contained on plate 2. Horizontal plate 2 is substantially round except for one side that has attached a vertical chordal weir 5 that discharges into segmental or round downcomer 6. A solids-containing water stream in line 7 is passed through pressure reducing valve 8 and line 9, inlet 10 and is flashed into flash column 1. Substantially solids-free impure water is passed through line 11 and inlet 12 on to plate 2. Stripped water overflows weir 5 and flows down through downcomer 6 to a return-water side chamber (not shown in FIG. 1).

With reference to the FIG. 2, unpacked, free-flow noncatalytic refractory lined synthesis gas generator 15, as previously described has an annulus-type burner 16 mounted in its upper inlet port 17 along the vertical axis. The feed streams are introduced into the reaction zone 18 of the gas generator by way of burner 16. They include a free oxygen containing gas stream which passes through line 19, and the central conduit (not shown) of the burner, a stream of steam which passes through lines 20 and 21, and a stream of hydrocarbonaceous fuel which passes through lines 22 and 21. The latter two streams are mixed together in line 21 and the mixture is then passed through the annulus passage (not shown) in burner 16.

The effluent stream of gas leaves the reaction zone and passes through exit passage 23 and directly into an insulated chamber 24 where the effluent gas stream is split into two gas streams. One split stream of raw synthesis gas passes through insulated transfer line 25 into the first train of process steps which ends with the production of a stream of unshifted product gas in line 26. The remainder of the effluent gas stream comprises the second split stream. The second split stream is processed in the second train which terminates with the production of a stream of shifted product gas in line 27. The mole ratio $H_2/CO$ of the shifted gas stream 27 is greater than the mole ratio $H_2/CO$ of unshifted gas stream 26.

Returning now to the first train and the first split stream of raw gas in transfer line 25, this gas stream is passed through inlet 29 of gas cooler 30 where it is cooled by indirect heat exchange with a stream of boiler feed water from line 31. The boiler feed water passes through inlet 32 and leaves as steam through outlet 33 and line 34. The cooled gas stream leaves through outlet 35, line 36, inlet 37, dip tube 38 and is contacted with water 39 in the bottom section 40 of gas scrubber 41. The process gas stream passes up through the water in the annular passage made by the inner surface of concentric pipe 42 and the outer surface of dip tube 38 and leaves by outlet 43 and line 44. The process gas stream then passes through venturi scrubber 45 where it is washed with water from line 46. It is then passed up through upper chamber 47 of gas scrubber 41. Water from line 48 and inlet 49 enters upper chamber 47 and cascades down over a series of trays 50 in reverse flow and in contact with the process gas stream which is simultaneously passing up through the chamber. Water from the bottom of upper chamber 47 passes through outlet 51, line 52, and enters bottom chamber 40 through inlet 53. Any entrained solids i.e. particulate carbon and ash are thereby scrubbed from the process gas stream and pass with the water through lines 57–59, and inlet 60 into separation vessel i.e. decanter 61.

The cleaned process gas stream leaving gas scrubber 41 through line 62 is cooled below the dew point in heat exchanger 63 by indirect heat exchange with cold water entering through line 64 and leaving by line 65. The cooled stream passes through line 66 into separation vessel 67 where the condensed water is removed at the bottom by way of line 68. By means of pump 69, the condensate is passed through lines 70, 71, 48, and inlet 49 into gas scrubber 41. A portion is by-passed through line 46 into venturi 45, as previously described. The cleaned unshifted product gas stream leaves separator 67 through line 26.

Returning now to the second train, the remainder of the gas stream passes through line 73, dip tube 74 and is quench cooled in a pool of water 75 contained in the bottom of quench tank 76. A dispersion of water and dispersed solids i.e. particulate carbon and ash is removed through outlet 79 and line 80 and sent to a carbon recovery and water reclaiming section to be further described. Periodically, ash which may build up in the bottom of quench vessel 76, may be removed with some water through bottom outlet 81, line 82, valve 83, and line 84 and sent to a conventional solids separation and recovery zone. Optionally, a conventional lock-hopper system (not shown) may be used to remove the solids.

The dispersion of particulate solids and water in line 80 is cooled in heat exchanger 85 by indirect heat exchange with reclaimed water from line 86. It is then passed through line 87, and mixed in line 58 with the particulate solids-water dispersion coming from gas scrubber 41 and line 57 in the first train. The mixture is then passed into decanter 61 by way of lines 59, and inlet 60.

After being quench cooled and partially cleaned with water in quench tank 76, the process gas stream in the second train passes up through draft tube 77 and leaves by outlet 89, line 90, and is scrubbed in orifice scrubber 91 with water from line 92. The process gas stream in line 93 enters separation vessel 94 by way of a dip tube 95. There, excess water drops out and leaves by way of line 96. This water stream is then recycled to quench tank 76. Before leaving separation vessel 94, by way of line 97, the process gas stream is sprayed with water 98 from line 99.

The cleaned process gas stream saturated with water in line 97 is preheated in heat exchanger 100 by indirect heat exchange with the shifted stream of gas leaving catalytic water-gas shift conversion zone 101 through line 102. The feed stream enters shift conversion zone 101 through line 103, and at least a portion of the CO and $H_2O$ in the process gas stream react therein to produce $H_2 + CO_2$. The resulting clean $H_2$-rich gas stream is cooled in heat exchanger 100 and is then passed through line 104 into gas cooler 105 where the temperature of gas stream is dropped below the dew point by indirect heat exchange with water. For example, boiler feed water in line 106 may be preheated in heat exchanger 105, passed through line 107, and then introduced into gas cooler 30 by way of line 31 where it is converted into steam. The cooled $H_2$-rich gas stream is passed through line 108 into condensate separator 109 where condensed water is drawn off at the bottom through line 110 and clean $H_2$-rich product gas exits through line 27 at the top.

The various solids-containing water streams or dispersions produced in the first and second trains are introduced into the carbon-recovery and water-reclaiming section of the process. Liquid organic extractant 115, such as naphtha in separation vessel 116, is passed through lines 117 to 120, and mixed in line 59 with the dispersion of water, particulate carbon, ash, and other impurities from line 58. Any required make-up liquid organic extractant may be introduced into the system through line 121, valve 122, and line 123. If desired, the liquid organic extractant in line 118 may be preheated by indirect heat exchange with the overhead from distillation column 137 in line 140. A portion of the liquid extractant in line 118 may be passed through line 125 into distillation column 137 as reflux. Sufficient liquid extractant is added to the dispersion to separate the particulate carbon from the water. The mixture passes through inlet 60, as previously mentioned, and passes up through an annular passage (not shown) that exists between concentric outer pipe 126 and inner pipe 127 in decanter 61, and then out through the lower horizontal radial nozzle 128. Simultaneously, in the second stage, a larger amount of liquid extractant from line 119 is passed through line 129, inlet 130, inner pipe 127, and upper horizontal radial nozzle 131. A dispersion comprising liquid extractant, particulate carbon, carry-over water, and other impurities is removed through line 132 and mixed in line 133 with heavy liquid hydrocarbon fuel oil from line 134. The mixture is heated in heater 135, and passed through line 136 into distillation column 137, equipped with reboiler 138. A slurry of heavy liquid hydrocarbon and particulate carbon is removed through line 139 at the bottom of column 137 and introduced into gas generator 15 as a portion of the fuel. The hot vapors in line 140 are passed into a cooler 141 and cooled below the dew point. The mixture of uncondensed gases, liquid extractant, and water is passed through line 142 into separator 116. Liquid organic extractant 115 floats on a layer of water 143 in separation vessel 116. Uncondensed gases are removed through line 144. The gas stream comprises at least one gas selected from the group $H_2S$, $NH_3$, $CO_2$, and hydrocarbon vapors and may be introduced into a Claus operation (not shown) for recovery of sulfur, or sent to flare. At least a portion of the water is removed through line 145. By means of pump 146, the water is pumped through line 147 on to stripping plate 148 of flash column 149. Optionally, a portion of the water may be passed through line 170, valve 171, and line 172 for use in gas generator 15.

Stripping plate 148 is substantially round except for one chordal side and is equipped with a plurality of vapor risers 150 and bell-caps 152. Steam stripped water 152 on plate 148 overflows vertical chordal weir 153 attached to the end of the otherwise round plate 148. The stripped water falls into segmental downcomer 154 and discharges beneath the water level 155 in return-water side chamber 156. Vertical weir 157 divides the bottom of flash-column 149 into return-water side chamber 156 and receiving side chamber 158. That portion of the water which is not flashed builds up in receiving side chamber 158 until water level 159 is reached when it overflows weir 157. Deflection shield or baffle 160 prevents unflashed water from dropping into chamber 156. Make-up water may be added through line 161.

In operation, the stream of water, dissolved gases i.e. $H_2S$, $NH_3$, $CO_2$, and particulate solids i.e. particulate carbon and ash separated in decanter 61 is introduced into flash column 149, below stripping plate 148 by way of line 162, pressure reducing valve 163, and line 164. If desired, for control of the total dissolved solids in the boiler feed water, a stream of water produced by blowing down a minor portion of the water in gas cooler 30 is also introduced into flash column 149 below stripping plate 148 and preferably below baffle 160 by way of line 165, pressure reducing valve 166, line 167 and internal pipe 168. At least a portion of stream 164 is flashed into steam and the remainder falls into receiving side chamber 158. There are practiaally no particulates in the water in line 168. At least a portion of this stream is flashed into stream and the remainder falls into chamber 156.

Water 143 at the bottom of separation vessel 116 contains dissolved gases i.e. $H_2S$, $NH_3$, $CO_2$ and waste hydrocarbons and is pumped by means of pump 146 on to stripping plate 148 in flash column 149 by way of lines 145 and 147. Steam in the space under plate 148 passes up through riser 150 and is deflected by bell-cap 151 through the water contained on stripper plate 148. The vapors leaving flash column 149 through line 175 are cooled below the dew point of water in cooler 176 and are passed through line 177 into separation vessel 116. Pipe 178 on the inside of vessel 116 discharges the gas stream below the surface of the pool of water 143.

The purified reclaimed water from the bottom of return-water side chamber 156 in water-flash column 149 is pumped by means of pump 181 to gas scrubber 41 in train I by way of lines 182, 183, 184, 71, 48, inlet 49, and also line 46 to venturi scrubber 45. A second stream of purified reclaimed water from chamber 156 is pumped through lines 182, 183, 86, heat exchanger 85, lines 185, 186, 99 to spray scrubber 94, and also line 92 to orifice scrubber 91.

Waste water containing solids is removed from the receiving-side chamber 158 and is discharged from the system through line 190.

EXAMPLE

The following example illustrates a preferred embodiment of the process of this invention as shown in the drawing which pertains to a partial oxidation process for the simultaneous production of two clean streams of gas in two separate trains, one gas stream being shifted and the other being unshifted. Both gas streams are cleaned by contact with reclaimed water produced in the process. While preferred modes of operation are illustrated, the Example should not be construed as limiting the scope of the invention. The process is continuous and the flow rates are specified on an hourly basis for all streams of materials.

162,356 lbs. of a vacuum resid having a gravity of 2.0 degrees API, an Ultimate Analysis in weight percent as follows: C 83.45, H 10.10, N 0.35, S 5.50, and O 0.60, an ash content of 0.3 weight % max. comprising in parts per million by weight of the elements vanadium 300 and nickel 50, and a salt content of 10.0 max. pounds per thousand barrels, are mixed with 2765 pounds of recycled unreacted particulate carbon recovered downstream in the process to produce a pumpable dispersion of particulate carbon and petroleum oil. The oil-carbon dispersion is pumped through a heater where it is brought up to a temperature of 540° F. and a pressure of 1165 psig. The dispersion is then mixed with a stream of 64,942 lbs. of steam at a temperature of 574° F. and a pressure of 1165 psig from line 20 in the drawing.

The oil-carbon-steam mixture is passed through the annulus of an annulus-type burner which is located in the upper end of a conventional vertical refractory lined free-flow noncatalytic unpacked synthesis gas generator 15.

Simultaneously, a stream of 171,033 lbs. of substantially pure oxygen i.e. 99.5 mole % $O_2$ from line 19 is passed through the center passage of the burner. The two streams impinge, mix and the partial oxidation and other related reactions then take place in the reaction zone of the gas generator.

A stream of 8.69 million standard cubic feet (SCF measured at 60° F., 14.7 psia) of raw gas leave the reaction zone of the gas generator at a temperature of 2596° F. and a pressure of 1050 psig. The composition of the raw gas at the exit 23 from reaction zone 18 is shown in Column 1 of Table I. About 2765 lbs. of unreacted carbon plus ash are entrained in the raw synthesis gas.

The raw effluent gas stream leaving the reaction zone is split into two streams at 24: 5.65 million SCF of raw gas are processed in a first train where no water-gas shift reaction i.e. no shifting takes place; and the remainder, 3.04 million SCF of raw gas are simultaneously processed in the second train where shifting takes place. The raw gas stream leaving gas cooler 30 in line 36 of the first train is cleaned in gas scrubber 41. After substantially all of the entrained carbon and ash are scrubbed from the raw gas stream and the gas stream is cooled below the dew point to condense out substantially all of the water, the composition of the unshifted product gas stream in line 26 is shown in column 2 of Table I.

About 21,540 gallons per hr. (GPH) of a water dispersion containing about 1 wt. % of particulate solids are removed from gas scrubber 41 through line 57 at a temperature of 310° F. and a pressure of 860 psig. The solids content of this water stream is reduced and the water is reclaimed for recycle to gas scrubber 41 in the manner to be further described.

Returning now to the second split stream of raw synthesis gas which comprises the remainder of the stream of raw gas stream leaving the reaction zone. By passing all of the raw gas from the reaction zone through a passage of reduced diameter at 23, the rate of flow may be accelerated and the velocity of the solid particles i.e. carbon and ash entrained in the gas stream may be increased. Accordingly, a large proportion of the solid particles may be entrained in the second split stream of raw gas which is directly quenched in the water contained in quench tank 78 located below the gas generator. The actual split of the gas stream between the first and second trains may be controlled by back pressure valves in each line.

The stream of 7.07 million SCF of raw gas stream in line 97 is saturated with water as the result of being quenched in quench tank 78 and scrubbed with water in scrubber 92 and spray 98. The gas stream in line 97 has the composition shown in column 3 of Table I. 7.07 million SCF of effluent gas leaving catalytic water-gas shift converter 101 through line 102 has the composition shown in column 4 of Table I. After being cooled by indirect heat exchange below the dew point, the shifted product gas stream in line 27 has the composition shown in Column 5 of Table I.

About 11,590 GPH of a water dispersion containing about 1 wt. % of particulate solids are removed from quench tank 78 by way of line 80 at a temperature of 460° F., and a pressure of 900 psig.

The water-particulate solids dispersions in line 57 and 80 are mixed together and resolved in decanter 61 in the manner previously described. About 32,520 GPH of a water dispersion containing about 0.03 wt. % of particulate solids are removed from decanter 61 through line 162 at a temperature of 300° F. and a pressure of 300 psig. This stream is passed through valve 163 where the pressure is dropped to 20 psig. At least a portion of this stream is converted into steam. The stream passes through line 164 and enters flash column 149 below stripping plate 148.

Periodically, blowdown water from gas cooler 33 at a temperature of 564° F. and a pressure of 1150 psig is passed through line 165 and through valve 166 where the pressure is reduced to 20 psig. At least a portion of this stream is converted into steam. The stream enters flash column 149 through line 167 and then passes through pipe 168 into the space below baffle plate 160. The steam rises up through the column and the unvaporized water falls into chamber 156.

331 GPH of water are separated from the overhead stream from decanter 61 in the manner previously discussed and collected in separator 116. This water at a temperature of 140° F. and a pressure of 20 psig is pumped through line 147 and is introduced on to stripping plate 148 of flash column 149. The overhead from flash column 149 is cooled below the dew point. Water separates out in separator 116. 1310 GPH of this water at a temperature of 140° F. and a pressure of 20 psig are pumped through line 147 on to stripping plate 148 of flash column 149.

29,300 GPH of reclaimed water at a temperature of 259° F. and a pressure of 20 psig are withdrawn from return water side 156 of flash column 149 by way of line 182. A portion of the reclaimed water in line 182 is recycled to gas scrubber 41 in the first train. Another portion of the reclaimed water in line 182 is recycled to orifice scrubber 91 and scrubber 98 in the second train. 3,600 GPH of waste water in receiving side chamber 158 of flash column 149 is withdrawn through line 190 and is discharged from the system.

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

TABLE I

| | GAS COMPOSITION - MOLE % | | | | |
|---|---|---|---|---|---|
| Column No. | 1 | 2 | 3 | 4 | 5 |
| Drawing Reference No. | 23 | 26 | 97 | 102 | 27 |
| COMPOSITION | | | | | |
| CO | 44.56 | 49.25 | 19.16 | 0.80 | 1.39 |
| $H_2$ | 39.87 | 44.06 | 17.14 | 35.51 | 61.96 |
| $CO_2$ | 4.27 | 4.72 | 1.83 | 20.23 | 35.31 |
| $H_2O$ | 9.52 | — | 61.10 | 42.69 | — |
| $CH_4$ | 0.36 | 0.40 | 0.15 | 0.16 | 0.27 |
| $A_r$ | 0.12 | 0.13 | 0.05 | 0.05 | 0.09 |
| $N_2$ | 0.09 | 0.10 | 0.04 | 0.04 | 0.07 |
| $H_2S$ | 1.15 | 1.27 | 0.50 | 0.52 | 0.91 |
| COS | 0.06 | 0.07 | 0.03 | — | — |

We claim:

1. In a partial oxidation process for producing gaseous mixtures comprising $H_2$, CO, $H_2O$, entrained particulate carbon and at least one material from the group $CO_2$, $H_2S$, COS, $CH_4$, $N_2$, Ar, and ash by the partial oxidation of a hydrocarbonaceous fuel with a free-oxygen containing gas optionally with a temperature moderator in a free-flow, non-catalytic gas generator at a temperature in the range of about 1300° to 3000° F. and a pressure in the range of about 1 to 250 atm., cooling the effluent gas stream from said reaction zone and contacting said gas stream with water in gas quenching or cleaning operations or both thereby removing said entrained particulate carbon and any ash and producing a clean gas stream and a carbon-water dispersion containing any ash, the improvement comprising: (1) mixing a liquid organic extractant with said carbon-water dispersion, and separating by gravity in a first separation zone a liquid extractant-particulate carbon dispersion containing at least one gaseous impurity selected from the group $H_2S$, $NH_3$, and $CO_2$, and a dilute water stream containing carbon and ash and at least one gaseous impurity selected from the group $H_2S$, $NH_3$, and $CO_2$; (2) mixing the extractant-carbon dispersion from (1) with a heavy liquid hydrocarbon; (3) separating the mixture from (2) in a distillation zone into (a) a dispersion of heavy liquid hydrocarbon and particulate carbon, (b) an overhead gaseous stream comprising $H_2O$, organic extractant, and at least one gaseous impurity from the group $H_2S$, $NH_3$, and $CO_2$; (4) removing the dispersion of heavy liquid hydrocarbon and particulate carbon from (3a) and introducing same into said gas generator as a portion of the feed; (5) cooling and condensing the overhead gaseous stream from said distillation zone and introducing the cooled stream into a second separation zone; (6) separating said cooled stream in said second separation zone into an upper layer of liquid organic extractant which floats on a lower layer of water containing at least one of said gaseous impurities, and an overhead stream of uncondensed gaseous impurities; (7) separating said liquid organic extractant and recycling same to said first separation zone in (1) as at least a portion of said extractant; introducing the water separated in the said second separation zone in (6) on to a horizontal stripping plate spaced within a vertical flash column comprising at least one stripping plate and first and second bottom chambers separated by a weir; and wherein each stripping plate contains dispersive means for dispersing steam produced below said stripping plate through the water on said stripping plate, and overflow and downflow means for discharging stripped water from each plate and into said second bottom chamber; (8) introducing at reduced pressure the water stream containing entrained solids from the first separation zone in (1) into said flash column below the bottom stripping plate and in the space above said first bottom chamber, thereby vaporizing a portion of said water stream and passing the vapors up through said dispersive means in each stripping plate and through the water contained on each plate thereby stripping gases from the water on each plate, and introducing the unvaporized portion of said water stream into said first bottoms chamber; (9) removing from said flash column a stream of vapors comprising $H_2O$, hydrocarbons and at least one member of the group $H_2S$, $NH_3$, and $CO_2$; cooling said vapor stream and condensing and separating in said second separation zone liquid water and liquid hydrocarbon from the uncondensed gases; and introducing at least a portion of water from said second separation zone on to a stripping plate in said flash column; (10) removing waste water containing solids from said first bottoms chamber and discharging same from the system; and (11) removing reclaimed water from said second bottoms chamber and recycling same to said gas cleaning operation.

2. The process of claim 1 provided with the step of introducing a portion of the water from said second separation zone in step (9) into the gas generator.

3. The process of claim 1 wherein the gaseous impurities from said second separation zone in step (6) and said uncondensed gases in step (9) comprises $H_2S$, COS and $CO_2$ and said gas stream is introduced into a Claus process for producing sulfur.

4. The process of claim 1 wherein blow-down water from a gas cooler is simultaneously flashed into the flash column in step (8) below said bottom stripping plate.

5. The process of claim 1 wherein the water separated in (6) is introduced on to the stripping plate in (7) at a temperature in the range of about 80° to 150° F.; the water stream containing entrained solids from the separation zone in (1) at a temperature in the range of about 180° to 500° F. and a pressure in the range of about 150 to 1000 psig is passed through a pressure reducing means and reduced to a pressure in the range of about 0 to 30 psig prior to being introduced into said flash column in (8) below said stripping plate thereby vaporizing a portion of said water, and the pressure in said flash column below each stripping plate is about 1 to 3 psig greater than the pressure in the column above said stripping plate; the stream of vapors removed from the flash column in (9) is at a temperature in the range of about 212° to 275° F.; the water from said second separation zone in step (9) is introduced into the flash column at a temperature in the range of about 80° to 175° F.; and waste water in (10) and reclaimed water in (11) are removed at a temperature in the range of about 212° to 275° F.

6. The process of claim 5 wherein the effluent gas stream from said reaction zone is cooled in a gas cooler, and blow-down water leaves said gas cooler at a temperature in the range of about 300° to 600° F. and is passed through a pressure reducing means and reduced to a pressure in the range of about 0 to 30 psig prior to being introduced into said flash column in (8), thereby vaporizing a portion of of said water.

7. The process of claim 1 provided with the step of recycling a portion of the liquid organic extractant separated in step (6) back to said distillation zone as reflux.

8. The process of claim 1 in which the total amount of liquid organic extractant that is mixed with said carbon-water dispersion in step (1) is in the range of about 10 to 200 times the weight of the particulate carbon in the carbon-water dispersion.

9. The process of claim 1 in which said hydrocarbonaceous fuel is a liquid hydrocarbon selected from the group consisting of liquefied petroleum gas, petroleum distillates and residua, gasoline, naphtha, kerosine crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

10. The process of claim 1 in which said hydrocarbonaceous fuel is a pumpable slurry of a solid carbonaceous fuel in a liquid carrier from the group consisting of water, liquid hydrocarbon fuel, and mixtures thereof.

11. The process of claim 1 in which said hydrocarbonaceous fuel is a gaseous feedstock from the group consisting of ethane, propane, butane, pentane, methane, natural gas, coke-oven gas, refinery gas, acetylene tail gas, ethylene off-gas, and mixtures thereof.

12. The process of claim 1 in which said hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

13. The process of claim 1 in which said temperature moderator is selected from the group consisting of $H_2O$, $CO_2$, $N_2$, cooled effluent gas from the gas generator, and mixtures thereof.

14. The process of claim 1 in which said free-oxygen containing gas is selected from the group consisting of air, oxygen-enriched-air i.e. greater than 21 mole % $O_2$, and substantially pure oxygen, i.e. greater than about 95 mole % oxygen.

15. The process of claim 1 wherein said liquid organic extractant is selected from the group consisting of (1) light liquid hydrocarbon fuels having an atmospheric boiling point in the range of about 100° to 750° F., density in degrees API in the range of over 20 to about 100, and a carbon number in the range of about 5 to 16; (2) a mixture of substantially water insoluble liquid organic by-products from an oxo or oxyl process; and (3) mixtures of types (1) and (2).

16. The process of claim 1 wherein said liquid organic extractant is selected from the group consisting of butanes, pentanes, hexanes, toluol, natural gasoline, gasoline, naphtha, gas oil, and mixtures thereof.

17. The process of claim 1 wherein said heavy liquid hydrocarbon fuel has a gravity in degrees API in the range of about −20 to 20.

18. The process of claim 1 wherein a portion of the water from step (11) is recycled to the gas generator.

19. In a partial oxidation process for producing gaseous mixtures comprising $H_2$, CO, $H_2O$, entrained particulate carbon and at least one material from the group $CO_2$, $H_2S$, COS, $CH_4$, $N_2$, Ar, and ash by the partial oxidation of a hydrocarbonaceous fuel with a free-oxygen containing gas optionally with a temperature moderator in a free-flow, non-catalytic gas generator at a temperature in the range of about 1300° to 3000° F. and a pressure in the range of about 1 to 250 atm., cooling the effluent gas stream with water in gas quenching or cleaning operations or both thereby removing said entrained particulate carbon and any ash and producing a clean gas stream and a carbon-water dispersion containing any ash, the improvement comprising: (1) introducing into the first stage of a two-stage decanting operation a mixture comprising said carbon-water dispersion and a first portion of liquid organic extractant from (7) in an amount which is sufficient to resolve said carbon-water dispersion; simultaneously introducing into the second stage of said decanting operation a second portion of said liquid organic extractant from (7) in an amount sufficient to produce a pumpable liquid organic extractant-particulate carbon-water dispersion having a solids content in the range of about 0.5 to 9.0 wt.%; and separating by gravity in a first separation zone a liquid extractant-particulate carbon dispersion containing at least one gaseous impurity selected from the group $H_2S$, $NH_3$, and $CO_2$, and a dilute water stream containing carbon and ash and at least one gaseous impurity selected from the group $H_2S$, $NH_3$, and $CO_2$; (2) mixing the extractant-carbon dispersion from (1) with a heavy liquid hydrocarbon; (3) separating the mixture from (2) in a distillation zone into (a) a dispersion of heavy liquid hydrocarbon and particulate carbon, and (b) an overhead gaseous stream comprising $H_2O$, organic extractant, and at least one gaseous impurity from the group $H_2S$, $NH_3$, and $CO_2$; (4) removing the dispersion of heavy liquid hydrocarbon and particulate carbon from (3a) and introducing same into said gas generator as a portion of the feed; (5) cooling and condensing the overhead gaseous stream from said distillation zone and introducing the cooled stream into a second separation zone; (6) separating said cooled stream in said second separation zone in (5) into an upper layer of liquid organic extractant with floats on a lower layer of water containing at least one of said gaseous impurities, and an overhead stream of uncondensed gaseous impurities; (7) separating said liquid organic extractant and recycling at least a portion of same to said first separation zone in (1) as at leat a portion of said extractant; introducing at least a portion of the water separated in said second separation zone in (6) on to a horizontal stripping plate spaced within a vertical flash column containing first and second bottom chambers separated by a weir; and wherein said stripping plate contains dispersive means for dispersing steam produced below said stripping plate through the water on said stripping plate and overflow and downflow means for discharging stripped water from said stripping plate into said second bottom chamber; (8) introducing at reduced pressure the dilute water stream containing entrained solids from the first separation zone in (1) into said flash column below said stripping plate and in the space above said first bottom chamber, thereby vaporizing a portion of said water stream and passing the vapors up through said dispersive means in said stripping plate and through the water contained on said plate thereby stripping gases from said water, and introducing the unvaporized portion of said water stream into said first bottoms chamber; (9) removing from said flash column a stream of vapors comprising $H_2O$, hydrocarbons and at least one member of the group $H_2S$, $NH_3$, and $CO_2$; cooling said vapor stream and condensing and separating in said second separation zone liquid water and liquid hydrocarbon from the uncondensed gases and recycling at least a portion of said water on to the stripping plate of said flash column; (10) removing waste water containing solids from said first bottoms chamber and discharging same from the system; and (11) removing reclaimed water from said second bottoms chamber and recycling same to said gas cleaning operation.

20. The process of claim 19 in which the amount of said liquid organic extractant introduced into the first stage of said decanting operation in (1) is in the range of about 1.5 to 15 lbs. of extractant per lb. of carbon.

21. Process for the simultaneous production of a clean gas mixture comprising $H_2$ and CO, and a clean $H_2$-rich gas stream comprising (1) reacting a hydrocarbonaceous fuel with substantially pure oxygen, in the presence of steam in the reaction zone of a free-flow noncatalytic partial-oxidation gas generator at a temperature in the range of about 1300° to 3000° F. and at a pressure in the range of about 1 to 250 atmospheres to produce an effluent gas stream comprising $H_2$, CO, $H_2O$, solid particles of carbon and ash and at least one gas from the group consisting of $CO_2$, $H_2S$, COS, $CH_4$, $NH_3$, $N_2$ and Ar; (2) splitting the effluent gas stream from (1) into first and second gas streams, and simultaneously processing said first and second gas streams in separate first and second trains; (3) cooling said first gas stream from (2) in said first train by indirect heat exchange with boiler feed water in a gas cooler thereby producing steam; (4) cleaning the process gas stream from (3) in a first gas cleaning zone by contacting same with water, thereby producing a pumpable dispersion of solid particles and water; (5) cooling and condensing water from the process gas stream from (4) thereby producing a clean product gas stream comprising $H_2$ and CO; (6) cooling and cleaning said second gas stream from (2) by direct contact with water in a second gas cleaning zone thereby removing the solid particles entrained therein and producing a pumpable dispersion of solid particles and water while increasing the $H_2O$/CO mole ratio of said gas stream to a value in the range of about 2 to 5; (7) reacting together CO and $H_2O$ in the gas stream from (6) in a water-gas shift conversion zone, and cooling and condensing water to produce a clean $H_2$-rich product gas stream; (8) introducing into a first separtion zone along with a liquid organic extractant the dispersion of solid particles in water from (4) and (6), and separating a lower layer comprising water, carbon, ash, and gaseous impurities, and an upper layer comprising a dispersion of particulate carbon, liquid organic extractant, water and gaseous impurities; (9) mixing the upper layer from (8) with a heavy liquid hydrocarbon; (10) separating the mixture from (9) in a distillation operation into (a) a dispersion of heavy liquid hydrocarbon and particulate carbon, and (b) an overhead gaseous stream comprising $H_2O$, organic extractant, and at least one gaseous impurity from the group $H_2S$, $NH_3$, and $CO_2$; (11) removing the dispersion of heavy liquid hydrocarbon and particulate carbon from 10 (a) and introducing same into said gas generator as a portion of the feed; (12) cooling and condensing said overhead gaseous stream (10) (b) and introducing the cooled stream into a second separation zone; (13) separating said cooled stream in said second separation zone in (12) into an upper layer of liquid organic extractant which floats on a lower layer of water containing at least one of said gaseous impurities; (14) separating said liquid organic extractant and recycling at least a portion of same to said first separation zone in (8) as at least a portion of said liquid organic extractant; (15) introducing the water separated in said second separation zone in (13) on to a horizontal stripping plate spaced within a vertical flash column containing a first and second bottom chamber separated by a wier; and wherein said stripping plate contains dispersive means for dispersing steam produced below said stripping plate through the water on said stripping plate, and overflow and downflow means for discharging stripped water from said stripping plate into said second bottom chamber; (16) introducing at reduced pressure the lower layer comprising water, carbon, ash, and gaseous impurities from the first separation zone in (8) into said flash column below said stripping plate and in the space above said first bottom chamber thereby vaporizing a portion of said water stream, and passing said vapors up through said dispersive means in said stripping plate and through the water contained on said plate thereby stripping gases from said water, and introducing the unvaporized portion of said water stream into said first bottoms chamber; (17) removing from said flash column a stream of vapors comprising $H_2O$, hydrocarbon, and at least one member of the group $H_2S$, $NH_3$, and $CO_2$; cooling said vapor stream and condensing and separating in said second separation zone liquid water and hydrocarbons from the uncondensed gases; and recycling said water on to the stripping plate of said flash column; (18) removing waste water containing solids from said first bottoms chamber and discharging same from the system; and (19) removing reclaimed water from said second bottoms chamber and recycling same to said gas cleaning zone in (4) and (6).

22. In a partial oxidation process for producing gaseous mixtures comprising $H_2$, CO, $H_2O$, entrained particulate carbon and at least one material from the group $CO_2$, $H_2S$ COS, $CH_4$, $N_2$, Ar, and ash by the partial oxidation of a hydrocarbonaceous fuel with a free-oxygen containing gas optionally with a temperature moderator in a free-flow, non-catalytic gas generator at a temperature in the range of about 1300° to 3000° F. and a pressure in the range of about 1 to 250 atm., cooling the effluent gas stream from said reaction zone and contacting said gas stream with water in gas quenching or cleaning operations or both thereby removing said entrained particulate carbon and any ash and producing a clean gas stream and a carbon-water dispersion containing any ash, the improvement comprising: (1) mixing a liquid organic extractant comprising a liquid hydrocarbon distillate substantially comprising about $C_3$ to about $C_{10}$ hydrocarbons with said carbon-water dispersion, and separating by gravity in a first separation zone a liquid extractant-particulate carbon dispersion containing at least one gaseous impurity selected from the group $H_2S$, $NH_3$, and $CO_2$, and a dilute water stream containing carbon and ash and at least one gaseous impurity selected from the group $H_2S$, $NH_3$, and $CO_2$; (2) introducing the liquid extractant-particulate carbon dispersion from the first separation zone into the gas generator as a portion of the hydrocarbonaceous fuel; (3) introducing the dilute water stream from said first separation zone at reduced pressure below the bottom stripping plate spaced within a vertical flash column comprising at least one stripping plate and first and second bottom chambers separated by a wier, and wherein each stripping plate contains dispersive means for dispersing steam produced below said stripping plate through the water on said stripping plate and overflow and downflow means for discharging stripped water from plate to plate or into said second bottom chamber; and wherein said dilute water stream from said first separation zone is flashed in the space above said first bottom chamber, thereby vaporizing a portion of said water stream and passing the vapors up through the dispersive means in each stripping plate and through the water contained on each plate thereby stripping gases from the water on each plate, and introducing the unvaporized portion of said water stream into said first bottoms chamber; (4) removing from said flash column a stream of vapors comprising $H_2O$, hydrocarbons and at least one member of the group $H_2S$, $NH_3$, and $CO_2$; cooling said vapor stream and condensing and separating in a second separation zone liquid water, hydrocarbon liquid or vapor, and uncondensed gases; introducing at least a portion of the water from said second separation zone on to a stripping plate in said flash column; introducing any hydrocarbon liquid separated in said second separation zone into said first separation zone or into said gas generator; and removing said uncondensed gases and said hydrocarbon vapor, if any; (5) removing waste water containing solids from said first bottoms chamber in (3) and discharging same from the system; and (6) removing reclaimed water from said second bottoms chamber in (3) and recycling same to said gas cleaning operation.

23. The process of claim 22 wherein said uncondensed gases and said hydrocarbon vapor, if any, removed from said second separation zone in step (4) is introduced into a Claus operation or sent to flare.

24. The process of claim 22 wherein fresh liquid hydrocarbon distillate substantially comprising about $C_3$ to about $C_{10}$ hydrocarbons is introduced into the gas generator as at least a portion of the hydrocarbonaceous fuel.

25. The process of claim 22 wherein said flash column is equipped with a single plate.

* * * * *